(12) United States Patent
Brescia

(10) Patent No.: US 8,578,362 B2
(45) Date of Patent: Nov. 5, 2013

(54) METHOD FOR DOWNLOADING SOFTWARE TO AN ELECTRONICS PRODUCT

(75) Inventor: Dennis Brescia, Windsor Locks, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 300 days.

(21) Appl. No.: 13/051,151

(22) Filed: Mar. 18, 2011

(65) Prior Publication Data
US 2012/0240107 A1 Sep. 20, 2012

(51) Int. Cl.
*G06F 9/44* (2006.01)
*G06F 9/445* (2006.01)

(52) U.S. Cl.
USPC ............................ 717/168; 717/173; 713/2

(58) Field of Classification Search
None
See application file for complete search history.

(56) References Cited

U.S. PATENT DOCUMENTS

| | | | |
|---|---|---|---|
| 5,444,861 A | 8/1995 | Adamec et al. | |
| 5,701,492 A | 12/1997 | Wadsworth et al. | |
| 5,960,445 A * | 9/1999 | Tamori et al. | 717/168 |
| 6,092,190 A * | 7/2000 | Lee | 713/2 |
| 6,115,654 A | 9/2000 | Eid et al. | |
| 6,308,265 B1 * | 10/2001 | Miller | 713/2 |
| 6,625,809 B1 * | 9/2003 | Duff | 717/169 |
| 6,704,865 B1 * | 3/2004 | Duff | 713/2 |
| 7,149,654 B2 | 12/2006 | Ramsdale et al. | |
| 7,185,191 B2 * | 2/2007 | Bosley et al. | 713/2 |
| 8,245,214 B2 * | 8/2012 | Long et al. | 717/168 |
| 8,341,386 B2 * | 12/2012 | Lee | 713/1 |

FOREIGN PATENT DOCUMENTS

EP 1 770 513 A2 4/2007

OTHER PUBLICATIONS

Sreedhar, T., et al., "Techniques for Reprogramming the Boot in Automotive Embedded Controllers," In-Vehicle Networks and Software [online], 2008 [retrieved Feb. 26, 2013], Retrieved from Internet: <http://fr.delphi.com/pdf/techpapers/2008-01-0384.pdf>, pp. 1-8.*
Extended European Search Report for EP Application Serial No. 12160236.1, dated Jun. 6, 2012, 7 pages.

* cited by examiner

*Primary Examiner* — Isaac Tecklu
*Assistant Examiner* — Todd Aguilera
(74) *Attorney, Agent, or Firm* — Kinney & Lange, P.A.

(57) ABSTRACT

A method for updating software on an electronics system that includes a processor switchable between modes and non-volatile memory includes over-writing original application software stored in an application sector of the memory to store cloned boot software such that original boot software remains in the memory, switching the system to a mode that accesses the cloned boot software, storing a temporary key in a key sector of the non-volatile memory that overrides an original key and is configured to instruct the processor to boot the cloned boot software upon initialization, over-writing the original boot software in the boot sector to store new boot software after storing the temporary key, storing a new key in the memory that is configured to instruct the processor to boot the new boot software upon initialization, erasing the temporary key, and switching the system to a mode that accesses the new boot software.

20 Claims, 2 Drawing Sheets

METHOD FOR DOWNLOADING SOFTWARE TO AN ELECTRONICS PRODUCT

BACKGROUND

The present invention relates generally to methods for downloading and updating software on electronic systems.

Electronic hardware systems, such as certain fuel system components for gas turbine engines including those for use with aircraft, frequently include software components. These software components can include applications used during regular operation of the hardware, as well as diagnostic, maintenance and other applications used in contexts other than during normal operation. Furthermore, these software components can include components used to boot (i.e., initialize) and manage communication with test equipment. It is often desired to update software to provide for bench and engine testing of hardware in the field, as well as for normal hardware operation. Updating applications using existing boot and management software is relatively simply because update, transmission and booting protocols handled by the boot and management software remains unchanged. Updates to applications can be made to hardware deployed in the field and can be accomplished relatively easily. However, it is sometimes necessary or desired to update the boot and management software on hardware components. Because this type of software governs or otherwise affects updating procedures, it cannot effectively govern updates to itself. An apt analogy would be that a surgeon cannot perform brain surgery on himself or herself.

In the prior art, updates to critical software were difficult. Often these updates cannot be performed in the field in-situ, or even at customer facilities when applicable hardware is removed from an installed location like a gas turbine engine or aircraft. Updates to critical software would typically require that the relevant hardware be returned to the manufacturer for updating by disassembling the hardware and reprogramming relevant printed circuit boards using special tools (e.g., a microprocessor network emulator using a joint test action group (JTAG) adapter) not available in the field. This process is burdensome and time consuming. Particularly in aerospace applications, down time associated with these software updates is undesirable and costly, and can be a burden to manufacturers having to handle and process the hardware associated with the software updates.

Systems and methods for performing software updates have been proposed that utilize external volatile memory (e.g., RAM) to perform an update to critical software. However, the use of volatile memory presents risk of non-recoverable system failure if there is a power failure during the updating process. Specifically, if existing boot and management software is entirely or partially deleted or otherwise in a corrupted state when a power failure occurs, software in the volatile memory will be lost and the hardware may become a "dead box" without the ability to reboot or recover from the power failure. In such a situation, it may be possible to recover functions of the hardware using special tools available in a shop, but this would still prevent the software update from being completed in the field—and would likely ultimately increase the burden of the update due to complications from the power failure.

Moreover, some electronics hardware includes loading functionality to update software, but such functionality is not available in all situations. It may be too burdensome and expensive to add loader functionality to existing hardware deployed in the field.

It is therefore desired to provide an alternative method for updating software on electronics hardware that is deployed in the field.

SUMMARY

A method according to the present invention updates software on an electronics system that includes a processor switchable between a boot & communication mode and an application mode and non-volatile memory having a plurality of sectors. The method includes over-writing original application software stored in an application sector of the non-volatile memory to store cloned boot software in the application sector such that original boot software remains in a boot sector of the non-volatile memory, switching the electronics system to operate in the application mode, thereby directing the electronics system to access the cloned boot software from the application sector of the non-volatile memory, storing a temporary key in a key sector of the non-volatile memory that overrides an original key and is configured to instruct the processor to boot the cloned boot software from the application sector of the non-volatile memory upon initialization, over-writing the original boot software in the boot sector of the non-volatile memory to store new boot software in the boot sector after the temporary key has been stored, storing a new key in the memory that is configured to instruct the processor to boot the new boot software from the boot sector of the non-volatile memory upon initialization, erasing the temporary key, and switching the electronics system to operate in the boot & communication mode, thereby directing the electronics system to access the new boot software from the boot sector of the non-volatile memory.

DETAILED DESCRIPTION

The present invention generally provides a system and method for downloading and updating software on electronics hardware that may be deployed in the field. Cloned software, which can be similar to original boot and test link software that governs system booting and communication with external test equipment but with some added features, can be downloaded to overwrite a non-volatile memory sector normally used to store application software. The cloned software can then provide a temporary key that changes the default booting procedure followed by a processor of the electronics hardware to boot from the cloned software in the application memory sector instead of the normal memory sector(s). This helps provide for protection against applicable components entering a non-recoverable state due to a power failure during subsequent software updating procedures. Original software, such as boot and/or test link software, is then over-written with new software to provide the desired update. Following any desired testing of the newly updated software, a new (permanent) key is provided that instructs the processor to boot and access the newly updated software from the normal memory sector(s). The temporary key can then be deleted. Application software can then be stored that over-writes the cloned software in the application memory sector.

The method of the present invention can be performed without requiring applicable hardware to be removed or otherwise returned to a shop, but instead can be updated while the hardware remains deployed in the field.

Figure 1:
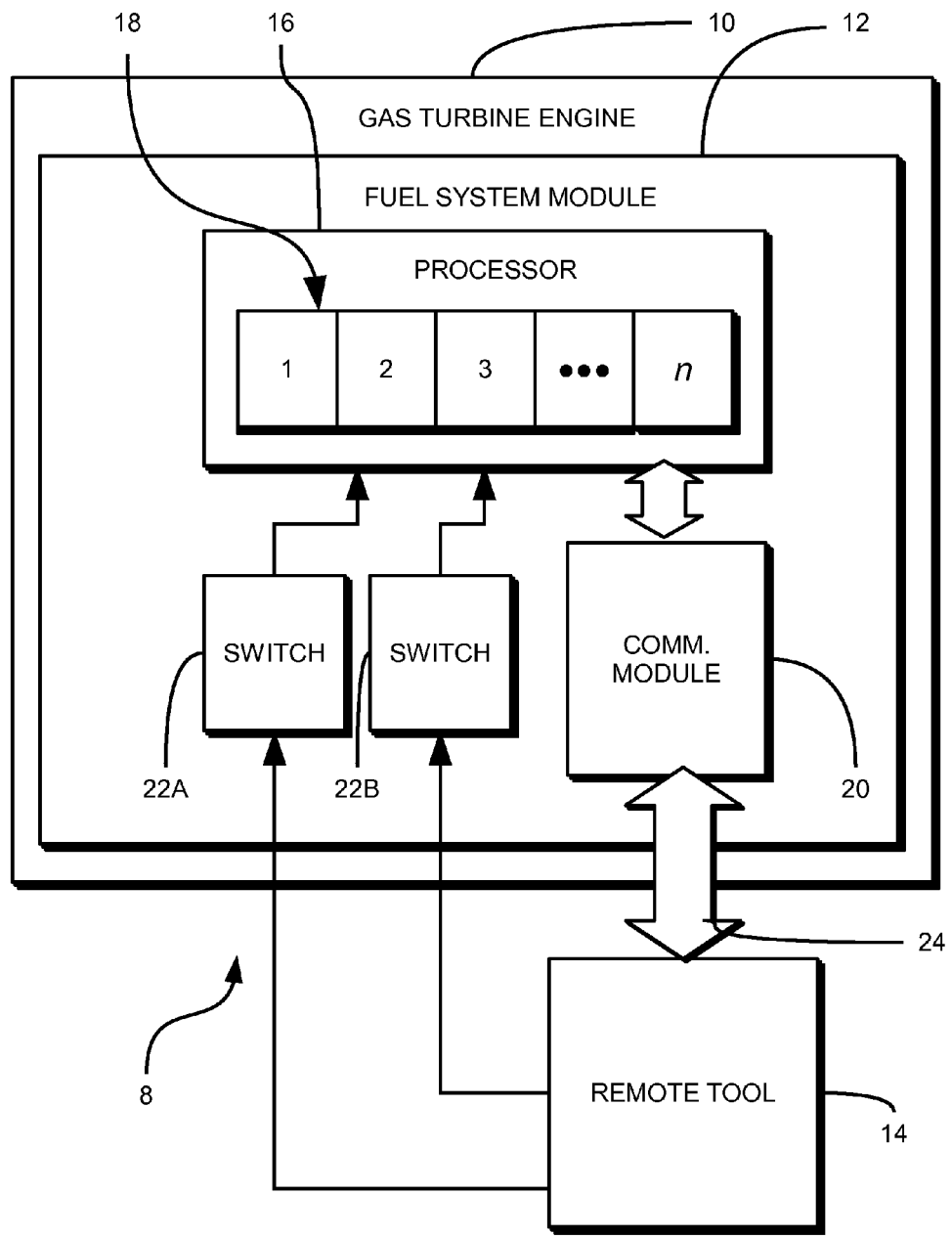
FIG. 1 is a block diagram of a gas turbine engine with a fuel system module operatively connected to an external remote tool.

FIG. 1 is a block diagram of a system 8 that includes a gas turbine engine 10 having a fuel system module 12. As shown in FIG. 1, the fuel system module 12 is operatively connected to a remote tool 14 located external to the gas turbine engine 10. It should be appreciated that while the present invention is illustrated with respect to an embodiment involving a fuel system module and a gas turbine engine, the present invention can be implemented with other types of gas turbine engine modules and components, as well as in other applications other than for gas turbine engines in further embodiments.

The fuel system module 12 includes a processor 16 having non-volatile memory 18 comprising discrete memory sectors (or blocks) 1 to n, a communications module 20, and switches 22A and 22B. The processor 16 can be of any suitable configuration, including known, conventional processor configurations. In one embodiment, the memory 18 comprises flash memory of a conventional configuration. In further embodiments the memory 18 can comprise any suitable type of non-volatile, computer-readable memory, including electrically erasable programmable read only memory (EEPROM), magnetic storage media, optical storage media, etc. Although in the illustrated embodiment the non-volatile memory 18 is integrated with the processor 16, in further embodiments the memory 18 could be external to the processor 16.

The communications module 20 can communicate with the processor 16, and can be configured to provide communication with external equipment over a transmission medium 24 using suitable digital or analog signals. In the illustrated embodiment, the communications module 20 is configured to communicate externally over the transmission medium 24 using a conventional Ethernet protocol.

The switches 22A and 22B can be configured to accept signals (e.g., voltage signals) from the remote tool 14 or another external source. The switches 22A and 22B are configured to control operation of the processor 16 to switch operation of the fuel system module 12 between two modes, boot software can read information from the switches 22A and 22B (boot & BITE) to command the processor 16 to access appropriate software, such as test link software or application software, from an appropriate sector of the memory 18. The switches may be manually activated by an operator using the remote tool 14. In one embodiment, the two modes can be (a) a maintenance (or test) mode and (b) an application (or control active) mode. Maintenance mode allows the processor 16 to access test link software, which is configured to allow communication with the remote tool 14 to transmit data such as application updates. Application mode is a mode for normal operation of the fuel system module 12 running appropriate application software. In the illustrated embodiment, each switch 22A or 22B triggers a particular mode when it receives a signal. In further embodiments, additional switches can be provided to switch between additional modes and/or to enhance fault tolerance.

The remote tool 14 can be removably operatively connected to the fuel system module 12 via the communication medium 24, to communicate with the communications module 20, as well as through discrete connections to provide signals to the switches 22A and 22B. The remote tool 14 can deliver software update files to the fuel system module 12 via the communication module 20. An operator can utilize the remote tool 14 to manually control the switches 22A and 22B, and to control operation of the fuel system module 12 when in maintenance mode (e.g., via test link software). In various embodiments, the remote tool 14 can be a portable programmer, a computer (e.g., running a UNIX operating system), or other suitable device.

Figure 2A:
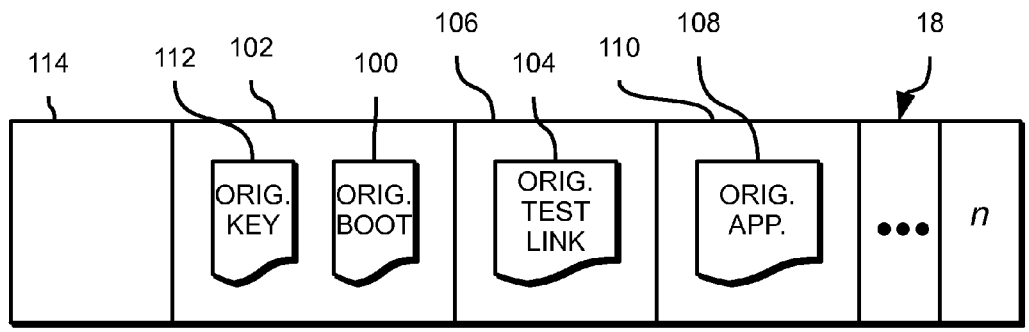
FIGS. 2A-2D are schematic diagrams representing memory sectors and electronic data during selected stages of a software update method according to the present invention.

FIGS. 2A-2D are schematic diagrams representing memory sectors of the non-volatile memory 18 and software files saved therein during selected stages of a software update method. FIG. 2A illustrates the memory 18 in its initial state prior to beginning the update procedure. Original boot software 100 is stored in a boot memory sector 102 of the memory 18, original test link software 104 is stored in a test link memory sector 106 of the memory 18, original application software 108 is stored in an application memory sector 110 of the memory 18, and an original key 112 is stored in the boot memory sector 102 (alongside the original boot software 100). A key sector 114 of the memory 18 is also provided, which can be empty or unused initially. The original boot software 100, in general, provides functionality to boot up electronic components of the fuel system module 12. The original test link software 104, in general, provides the ability to communicate with the remote tool 14 via the communication module 20 and the communication medium 24, and to load and update data in the memory 18. The original key 112 works with built-in features of the processor 16 to instruct the processor where to look in the memory 18 for relevant software during initialization. More particularly, the processor 16 can be configured to automatically look to particular sectors of the memory 18 for initialization information in a set sequence (i.e., hierarchy), with the boot memory sector 102 being one of those particular sectors (empty sectors of the memory 18 in this set sequence can be ignored by the processor 16 until a sector in the hierarchy is reached containing suitable key information). The original key 112 can be configured to instruct the processor 16 to look to the boot memory sector 102 upon initialization, such as after resetting power to the fuel system module 12.

In order to begin the software update process, the remote tool 14 is connected to the communication module 20 of the fuel system module 12 using the communication medium 24. Connections are also made from the remote tool 14 to the switches 22A and 22B. The appropriate switch 22A or 22B is triggered to place the fuel system module 12 in maintenance mode. The original key 112 and original boot software 100 of boot memory sector 102 are used to execute in maintenance mode. The cloned boot & test link software 116 is loaded into and stored in the application memory sector 110 of the memory 18 (i.e., where the original application software 108 is normally stored) using the same procedure as would normally be performed to load new application software. At this point, the cloned boot & test link software 116 over-writes the original application software 108 in the application memory sector 110, while leaving the unaltered original boot software 100 stored in the boot memory sector 102 and the unaltered original test link software 104 stored in the test link memory sector 106. After the cloned boot & test link software 116 is loaded into the application memory sector 110, the remote tool 14 triggers the other switch 22A or 22B to switch the fuel system module 12 to the application mode. The fuel system module 12 is then reset, which can be performed by toggling power. Upon initialization, the original key 112 directs the processor 16 to the original boot software 100, which interprets input for the switch 22A or 22B, and then causes the fuel system module 12 to access, boot and run the cloned boot & test link software 116 in the application memory sector 110. After the original boot software 100 recognizes the switch 22A or 22B input, the original boot software 100 stored in the boot memory sector 102 and the original test link software 104 stored in the test link memory sector 106 sit unused.

Figure 2B:
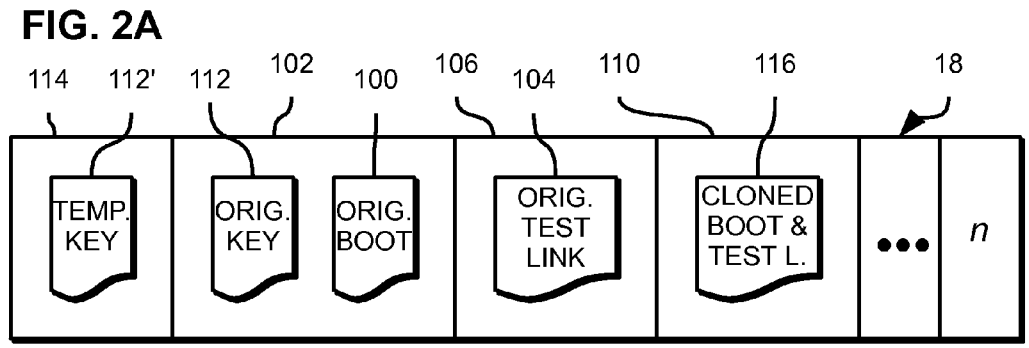

The cloned boot & test link software 116 has features generally similar to the original boot software 100 and the original test link software 104, but with some modifications that make them different. Specifically, the cloned boot & test link software 116 may be an externally re-linked version of the original boot software 100 and original test link software 104 with remapped addresses to execute from the application memory sector 110. Additionally, the cloned boot & test link software 116 can further include a temporary key 112' that is exported from the cloned boot & test link software 116 and stored to the key memory sector 114 (the original key 112 can remain in the boot memory sector 102 at this time). The temporary key 112' can be configured to instruct the processor 16 to access the application memory sector 110. The key memory sector 114 can be in a particular sector of the memory 18 where the processor 16 looks for initialization information, and can be of a higher priority than the boot memory sector 102. In other words, the processor 16 will look to the key memory sector 114 before the boot memory sector 102, effectively overriding the original key 112 with the temporary key 112'. In the event of a power failure (e.g., a loss of power to the fuel system module 12) during subsequent steps of the software update process, the temporary key 112' helps ensure that the fuel system module 12 can initialize and reboot (without requiring any access to the original boot software 100 stored in the boot memory sector 102 or the original test link software 104 stored in the test link memory sector 106), as well as continue with the update process. Without the temporary key 112', a power failure that occurs during the updates to the boot and test link memory sectors 102 and 106 could render the fuel system module 12 a "dead box" that cannot function due to missing or corrupted software in the boot and test link memory sectors 102 and 106, which would be the only place the processor 16 would normally look for boot and test link software and to interpret input from the switches 22A and 22B. FIG. 2B illustrates the memory 18 after the cloned boot & test link software 116 has been stored in the application memory sector 110 and the temporary key 112' has been stored in the key memory sector 114.

With the fuel system module 12 running the cloned boot & test link software 116 stored in the application memory sector 110, new boot software 100' and a new key 112" can be stored to the boot memory sector 102 to over-write the original boot software 100 and the original key 112. Also, new test link software 104' can be stored to the test link memory sector 106 to over-write the original test link software 104. One or more suitable test protocols can then be run (e.g., by the cloned boot & test link software 116) to verify that the new boot software 100' and the new test link software 104' have been fully installed in the boot memory sector 102 and the test link memory sector 106, respectively, and are in working order. The temporary key 112' in the key memory sector 114 can then be erased, such that the processor 16 will be directed to the boot memory sector 102 to look for the new key 112". The new key 112" can be configured to instruct the processor 16 to look to the boot memory sector 102 upon initialization, such as after resetting power to the fuel system module 12. In one embodiment, the new key 112" is identical to the original key 112.

Figure 2C:
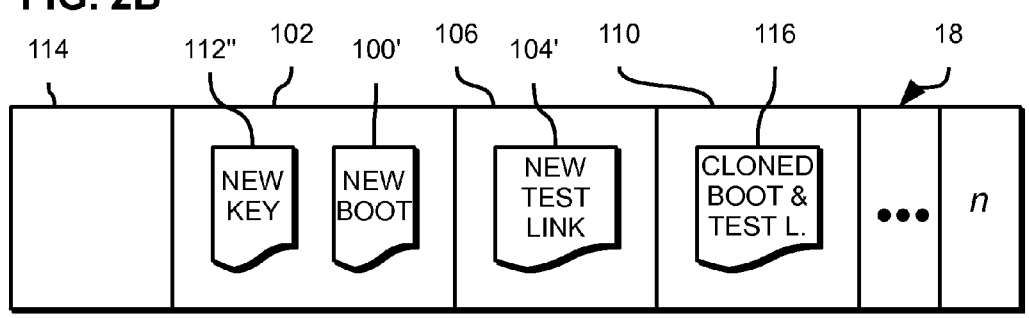

FIG. 2C illustrates the memory 18 after the new boot software 100' has been stored to the boot memory sector 102 and the new test link software 104' has been stored to the test link memory sector 106. As noted above, if any power failure occurs during this process of over-writing the original boot software 100 and the original test link software 104, the temporary key 112' allows the cloned boot & test link software 116 to run after power is returned, allowing the fuel system module 12 to run despite any missing or corrupted data in the memory sectors 102 and 106 resulting from incomplete updating before the power failure (i.e., a mid-update power failure). Because the cloned boot & test link software 116 is stored in non-volatile memory, the contents of the application memory sector 110 should remain unaffected and fully operational following the power failure. If the temporary key 112' were not provided and a mid-update power failure occurred, triggering the switches 22A and 22B would have no effect, because the original boot software 100 interprets activation of the switches 22A and 22B, and corruptions or absence of the original boot software 100 would accordingly frustrate action by the processor 16.

Figure 2D:
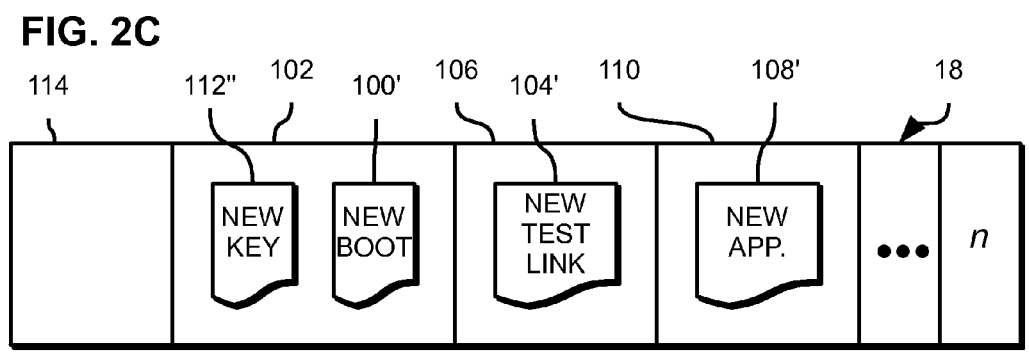

Next, the remote tool 14 can trigger the appropriate switch 22A or 22B to place the fuel system module 12 to maintenance mode. Power to the fuel system module 12 can then be reset. At this point the new boot and test link software 100' and 104' can be run from the boot and test link memory sectors 102 and 106, respectively. New application software 108' can then be loaded and stored to the application memory sector 110, over-writing the cloned boot & test link software 116. The new application software 108' can be identical to the original application software 108, if no updates to applications are needed, or can be different from the original application software 108 to include any desired updates. The fuel system module 12 is now fully updated. Upon triggering the appropriate switch 22A or 22B to activate the application mode, the fuel system module 12 is ready for normal operation. FIG. 2D illustrates the memory 18 upon completion of the software update, after the new application software 108' has been stored to the application memory sector 110.

It should be appreciated that the present invention can be used to update only the boot software, only the test link software, or both the boot and test link software as desired.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, a configuration of the electronics system can vary as desired for particular applications. Moreover, while the present invention has been described with respect to boot and test link software, it can be applied to other types of software as well in further embodiments. Additionally, the particular memory sectors or memory units in which particular software is stored can vary in further embodiments.

The invention claimed is:

1. A method for updating software on an electronics system that includes a processor switchable between a maintenance mode and an application mode and non-volatile memory having a plurality of sectors, including a key sector, a boot sector, a test link sector and an application sector, the processor configured to automatically look to particular sectors of the non-volatile memory for initialization information in a set sequence during initialization until a sector in the set sequence is reached containing suitable key information, with empty sectors of the non-volatile memory in the set sequence ignored by the processor and with the key sector having a higher priority in the set sequence than the boot sector, the method comprising:

activating a manual switch to operate the processor in the maintenance mode, wherein the maintenance mode directs the electronics system to access software stored in the test link sector;

over-writing original application software stored in the application sector of the non-volatile memory to store cloned boot software in the application sector such that original boot software remains in the boot sector of the non-volatile memory;

manually switching the electronics system to operate in the application mode, thereby directing the electronics system to access the cloned boot software from the application sector of the non-volatile memory;

storing a temporary key in the key sector of the non-volatile memory that overrides an original key stored in the boot sector of the non-volatile memory and is configured to instruct the processor to boot the cloned boot software from the application sector of the non-volatile memory upon initialization;

over-writing the original boot software in the boot sector of the non-volatile memory to store new boot software in the boot sector after the temporary key has been stored;

storing a new key in the boot sector of the non-volatile memory alongside the new boot software, the new key configured to instruct the processor to boot the new boot software from the boot sector of the non-volatile memory upon initialization;

erasing the temporary key in the key sector of the non-volatile memory; and manually switching the electronics system to operate in the maintenance mode, thereby directing the electronics system to access the new boot software from the boot sector of the non-volatile memory.

2. The method of claim 1 and further comprising:
over-writing the cloned boot software in the application sector of the non-volatile memory with new application software.

3. The method of claim 2, wherein the new application software is identical to the original application software.

4. The method of claim 1, wherein the step of over-writing original application software stored in the application sector of the non-volatile memory to store cloned boot software in the application sector further comprises storing cloned test link software to the application sector.

5. The method of claim 4 and further comprising:
over-writing original test link software in the test link sector of the non-volatile memory to store new test link software in the test link sector after the temporary key has been stored.

6. The method of claim 1, wherein the new key is identical to the original key.

7. The method of claim 1, wherein the cloned boot software is different from the original boot software.

8. The method of claim 1 and further comprising:
performing a test protocol on the new boot software in the boot sector of the non-volatile memory prior to erasing the temporary key in the key sector of the non-volatile memory.

9. The method of claim 1 and further comprising:
toggling power of the electronics system after manually switching the electronics system to operate in the application mode, thereby resetting the electronics system.

10. A method for updating software on an electronics system that includes a processor switchable between a maintenance mode and an application mode and non-volatile memory having a plurality of sectors, including a key sector, a boot sector, a test link sector and an application sector, the processor configured to automatically look to particular sectors of the non-volatile memory for initialization information in a set sequence during initialization until a sector in the set sequence is reached containing suitable key information, with empty sectors of the non-volatile memory in the set sequence ignored by the processor and with the key sector having a higher priority in the set sequence than the boot sector, the method comprising:

activating a manual switch to operate the processor in the maintenance mode, wherein the maintenance mode directs the electronics system to access software stored in the test link sector;

over-writing original application software stored in the application sector of the non-volatile memory to store cloned test link software in the application sector such that original test link software remains in the test link sector of the non-volatile memory;

manually switching the electronics system to operate in the application mode, thereby directing the electronics system to access the cloned test link software from the application sector of the non-volatile memory;

storing a temporary key in the key sector of the non-volatile memory that overrides an original key stored in the boot sector of the non-volatile memory and is configured to help instruct the processor to access the cloned test link software from the application sector of the non-volatile memory;

over-writing the original test link software in the test link sector of the non-volatile memory to store new test link software in the test link sector after the temporary key has been stored;

storing a new key in the boot sector of the non-volatile memory that is configured to help instruct the processor to access the new test link software from the test link sector of the non-volatile memory;

erasing the temporary key in the key sector of the non-volatile memory; and manually switching the electronics system to operate in the maintenance mode, thereby directing the electronics system to access the new test link software from the test link sector of the non-volatile memory.

11. The method of claim 10 and further comprising:
over-writing the cloned test link software in the application sector of the non-volatile memory with new application software.

12. The method of claim 11, wherein the new application software is identical to the original application software.

13. The method of claim 10, wherein the new key is identical to the original key.

14. The method of claim 10 and further comprising:
performing a test protocol on the new test link software in the test link sector of the non-volatile memory prior to erasing the temporary key in the key sector of the non-volatile memory.

15. The method of claim 10, wherein the step of over-writing original application software stored in an application sector of the non-volatile memory to store cloned test link software in the application sector such that original test link software remains in a test link sector of the non-volatile memory further comprises:

storing cloned boot software in the application sector of the non-volatile memory such that original boot software remains in a boot sector of the non-volatile memory.

16. A method for updating software on an electronics system that includes a processor switchable between a maintenance mode and an application mode and non-volatile memory having a plurality of sectors, including a key sector, a boot sector, a test link sector and an application sector, the processor configured to automatically look to particular sectors of the non-volatile memory for initialization information in a set sequence during initialization until a sector in the set sequence is reached containing suitable key information, with empty sectors of the non-volatile memory in the set sequence ignored by the processor and with the key sector having a higher priority in the set sequence than the boot sector, the method comprising:

activating a manual switch to operate the processor in the maintenance mode, wherein the maintenance mode directs the electronics system to access software stored in the test link sector;

over-writing original application software stored in the application sector of the non-volatile memory to store cloned boot and test link software in the application sector such that original boot software remains in the boot sector of the non-volatile memory and original test link software remains in the test link sector of the non-volatile memory;

manually switching the electronics system to operate in the application mode, thereby directing the electronics system to access the cloned boot and test link software from the application sector of the non-volatile memory;

storing a temporary key in the key sector of the non-volatile memory that overrides an original key stored in the boot sector of the non-volatile memory and is configured to instruct the processor to access the cloned boot and test link software from the application sector of the non-volatile memory upon initialization;

over-writing the original boot software in the boot sector of the non-volatile memory to store new boot software in the boot sector after the temporary key has been stored;

over-writing the original test link software in the test link sector of the non-volatile memory to store new test link software in the test link sector after the temporary key has been stored;

storing a new key in the non-volatile memory that is configured to instruct the processor to boot the new boot software from the boot sector of the non-volatile memory upon initialization, wherein the new key is stored in the boot sector of the non-volatile memory alongside the new boot software;

erasing the temporary key in the key sector of the non-volatile memory;

manually switching the electronics system to operate in the maintenance mode, thereby directing the electronics system to access the new boot software from the boot sector of the non-volatile memory; and over-writing the cloned boot and test link software in the application sector of the non-volatile memory with new application software.

17. The method of claim 16, wherein the new application software is identical to the original application software.

18. The method of claim 16, wherein the new key is identical to the original key.

19. The method of claim 16, wherein the cloned boot software is different from the original boot software.

20. The method of claim 16 and further comprising:

performing a test protocol on the new boot software in the boot sector of the non-volatile memory prior to erasing the temporary key in the key sector of the non-volatile memory.

\* \* \* \* \*